US007890869B1

(12) United States Patent
Mayer et al.

(10) Patent No.: US 7,890,869 B1
(45) Date of Patent: Feb. 15, 2011

(54) NETWORK SECURITY VISUALIZATION METHODS, APPARATUS AND GRAPHICAL USER INTERFACES

(75) Inventors: Alain Jules Mayer, San Francisco, CA (US); Brian Laing, San Carlos, CA (US); Michael Lloyd, Belmont, CA (US)

(73) Assignee: Redseal Systems, Inc., Redwood City, CA (US)

( * ) Notice: Subject to any disclaimer, the term of this patent is extended or adjusted under 35 U.S.C. 154(b) by 785 days.

(21) Appl. No.: 11/761,972

(22) Filed: Jun. 12, 2007

Related U.S. Application Data

(60) Provisional application No. 60/804,930, filed on Jun. 15, 2006, provisional application No. 60/813,603, filed on Jun. 12, 2006, provisional application No. 60/804,552, filed on Jun. 12, 2006.

(51) Int. Cl.
  *G06F 15/177* (2006.01)
(52) U.S. Cl. .................... 715/736; 709/224; 715/734; 726/25
(58) Field of Classification Search ............. 715/734, 715/736; 726/25; 709/224
See application file for complete search history.

(56) References Cited

U.S. PATENT DOCUMENTS

| 6,484,261 | B1* | 11/2002 | Wiegel .................. 726/11 |
| 6,535,227 | B1 | 3/2003 | Fox et al. |
| 7,137,074 | B1* | 11/2006 | Newton et al. ............. 715/835 |
| 7,146,568 | B2* | 12/2006 | Richardson ............... 715/736 |
| 7,257,630 | B2* | 8/2007 | Cole et al. ................ 709/224 |
| 2002/0147803 | A1 | 10/2002 | Dodd et al. |
| 2003/0056116 | A1* | 3/2003 | Bunker et al. ............. 713/201 |
| 2003/0140249 | A1 | 7/2003 | Taninaka et al. |
| 2003/0212779 | A1 | 11/2003 | Boyter et al. |
| 2004/0015728 | A1 | 1/2004 | Cole et al. |
| 2005/0050351 | A1 | 3/2005 | Cain |
| 2005/0216957 | A1 | 9/2005 | Banzhof et al. |
| 2005/0257268 | A1* | 11/2005 | Guo et al. ................. 726/25 |
| 2006/0010497 | A1 | 1/2006 | O'Brien et al. |
| 2006/0129672 | A1 | 6/2006 | Mayer |
| 2006/0265324 | A1* | 11/2006 | Leclerc et al. ............. 705/38 |
| 2006/0265751 | A1 | 11/2006 | Cosquer et al. |
| 2007/0006315 | A1* | 1/2007 | Bushnaq .................. 726/25 |

(Continued)

OTHER PUBLICATIONS

Office Action for U.S. Appl. No. 11/761,968, dated Sep. 28, 2010.

(Continued)

*Primary Examiner*—William L Bashore
*Assistant Examiner*—Ashraf Zahr
(74) *Attorney, Agent, or Firm*—Kilpatrick Townsend and Stockton LLP; Kenneth R. Allen

(57) ABSTRACT

A method for a computer system including a display includes determining a plurality of security metrics associated with a plurality of servers within a network, displaying a tree map on the display representing at least a portion of the network, wherein the tree map comprises a plurality of shapes associated with servers from the plurality of servers, wherein a size of shapes in the plurality of shapes are determined in response to a first security metric from the plurality of security metric associated with the servers, and wherein an appearance of the shapes are determined in response to a second security metric from the plurality of security metrics associated with the servers.

20 Claims, 9 Drawing Sheets

U.S. PATENT DOCUMENTS

2007/0067848 A1* 3/2007 Gustave et al. .............. 726/25
2007/0186284 A1* 8/2007 McConnell .............. 726/25
2008/0092069 A1* 4/2008 Chan et al. .............. 715/763
2009/0271863 A1 10/2009 Govindavajhala et al.

OTHER PUBLICATIONS

Office Action for U.S. Appl. No. 11/761,977, dated Sep. 27, 2010.
Office Action for U.S. Appl. No. 11/761,982, dated Oct. 4, 2010.

* cited by examiner

NETWORK SECURITY VISUALIZATION METHODS, APPARATUS AND GRAPHICAL USER INTERFACES

CROSS-REFERENCES TO RELATED APPLICATIONS

The present application is also related to co-pending applications, application Ser. No. 11/761,968, filed on Jun. 12, 2007, entitled: Methods and Apparatus for Determining Network Risk Based upon Incomplete Network Configuration Data, application Ser. No. 11/761,977, filed on Jun. 12, 2007, entitled: Methods and Apparatus for Prioritization or Remediation Techniques for Network Security Risks, and application Ser. No. 11/761,982, filed on Jun. 12, 2007, entitled: Adaptive Risk Analysis Methods and Apparatus. The present application and co-pending applications claim benefit of priority under 35 U.S.C. 119(e) of U.S. provisional Application Nos. 60/804,552, filed on Jun. 12, 2006, 60/813,603 filed Jun. 12, 2006, and 60/804,930, filed Jun. 15, 2006. The above applications are hereby incorporated by reference for all purposes.

BACKGROUND OF THE INVENTION

The present invention relates to methods and apparatus for network analysis. More specifically, the present invention relates to methods and apparatus for determining vulnerability of a network (e.g. hosts, applications, data) to threats. Still more specifically, various embodiments of the present invention determination of vulnerabilities, prioritization of vulnerabilities of a network, visualization of vulnerabilities of a network to threats based upon incomplete configuration data (including vulnerabilities of hosts) of network devices. In various embodiments of the present invention, reference to a network and network configuration data includes not only network hardware and software, but also includes application host servers, and any other device forming part of a network, as well as software operating thereon.

Determination of threats to a network has been described in application Ser. No. 11/335,052 filed on Jan. 18, 2006, and herein by incorporated by reference for all purposes. In that application, one of the named inventors of the present application described determining a software model of the network based upon configuration data of "network devices" in the network. The "network devices" included routers, firewalls, host application servers, and other devices in the network. Based upon the software model, the previous application described determining potentially harmful traffic paths in the network by simulating the software model.

The inventors of the present application explicitly consider and address the problems of what happens if some or all configuration data (and host vulnerabilities) from the network, e.g. firewall, router, one or more host application servers, or the like, are incomplete, i.e. unavailable, not gathered, or the like. Problems such as how to determine threats based on incomplete data, how to prioritize threats that are determined based on incomplete data, how to provide visualization of threats determined based upon incomplete data, and the like are considered by the inventors.

The inventors of the present invention have determined that it would be advantageous to be provide such information to users such as network administrators even in cases where configuration data (and host vulnerabilities) from one or more host application servers is unavailable, incomplete, not gathered, or the like.

BRIEF SUMMARY OF THE INVENTION

The present invention relates to methods and apparatus for network security risk management. In various embodiments, network security risk management includes quantitizing security risk based upon incomplete network data; prioritizing between remediation actions; identifying changes in security risk based upon changes to the network, new threats, and the like; visualization of network security risks; and the like.

The inventors introduce the concept of "confidence" or "vulnerability certainty" to network analysis as one basis for prioritizing discovered threats or vulnerabilities. In various embodiments, "confidence" is typically based upon how much information may be known about one or more host servers. Such information may include the presence of a host server, network addresses associated with a host server, ports monitored by a host server, applications monitoring ports on the host server, versions of operating systems on the host server, versions of applications on the host server, vulnerability data of applications and operating systems, and the like. Unlike previous systems, embodiments of the present invention can operate with less than complete configuration information of the network e.g. host servers, or the like.

In various embodiments of the present invention, "harm probability," "vulnerability exploitablility," or "exposure" are associated with a threat or vulnerability. A "security risk" value or score is determined from the exposure and a "business value" or "asset value" associated with one or more host servers. The security risk score is considered when prioritizing the remediation of threats (vulnerabilities). Additionally, each host server may be associated with a confidence factor (vulnerability certainty), as discussed above.

In various embodiments, when determining threat paths within a network topology, the exposed risk and confidence factor are used to prioritize threats (prioritize the remediation of vulnerabilities). The quantization of security metrics, such as exposed risk, confidence factors, and the like, based upon incomplete network configuration data is herein termed "adaptive risk." In some embodiments risk is evaluated as a (risk, confidence) number pair.

In some embodiments, adaptive risk=exposed risk*confidence factor. For example, a first host server has a high exposed risk (e.g. 90), a high confidence factor (0.90), and an adaptive risk of 81, and a second host server that has a high exposed risk 80 but a lower confidence factor (0.5), and an adaptive risk of 40. In such an example, the first host server may be prioritized as having a potential vulnerability that should be addressed before the potential vulnerability of the second host server. As another example, a first host server has a low exposed risk (e.g. 45), a high confidence factor (e.g. 0.9), and an adaptive risk of 40.5, and a second host server that has a low exposed risk (e.g. 50), a low confidence factor (e.g. 0.50), and an adaptive risk of 23. In such an example, again the potential vulnerability of the first host server may be prioritized over the potential vulnerability of the second host server based upon the adaptive risks. In other embodiments, with different weights or different combinations of the exposed risk and confidence factors, a different prioritization that shown above may be determined. In some general cases, the least "dangerous" or vulnerable situation for the network is where a host server has a low exposed risk and a high confidence factor; the most "dangerous" or vulnerable situation for the network is where a host server has a high exposed risk and a high confidence factor; and other weightings are in between these situations.

According to one aspect of the invention, methods for a computer system including a display are described. A technique includes determining a plurality of security metrics associated with a plurality of servers within a network, and displaying a tree map on the display representing at least a portion of the network. In various embodiments, the tree map comprises a plurality of shapes associated with servers from the plurality of servers, and a size of shapes in the plurality of shapes are determined in response to a first security metric from the plurality of security metric associated with the servers. In various embodiments, an appearance of the shapes are determined in response to a second security metric from the plurality of security metrics associated with the servers.

According to another aspect of the invention, a computer system is disclosed. One system includes a processor configured to determine a plurality of security metrics associated with a plurality of servers within a network, and a memory configured to store the plurality of security metrics. An apparatus includes a display for displaying a tree map on the display representing at least a portion of the network, wherein the tree map comprises a plurality of shapes associated with servers from the plurality of servers, wherein a size of shapes in the plurality of shapes are determined in response to a first security metric from the plurality of security metric associated with the servers, and herein an appearance of the shapes are determined in response to a second security metric from the plurality of security metrics associated with the servers.

According to other aspects, a computer program product including computer-system executable-code resident on a tangible media is described. A computer program product may include code that directs the computer system to determine a plurality of security metrics associated with a plurality of servers within a network. A computer program product may also include code that directs the computer system to display a tree map on the display representing at least a portion of the network, wherein the tree map comprises a plurality of shapes associated with servers from the plurality of servers, wherein a size of shapes in the plurality of shapes are determined in response to a first security metric from the plurality of security metric associated with the servers, and wherein an appearance of the shapes are determined in response to a second security metric from the plurality of security metrics associated with the servers. The tangible media may include optical media, magnetic media, semiconductor media, or the like.

According to other aspects, a graphical user interface for a computer system including a display is disclosed. A GUI includes a first portion configured to display a tree map on the display representing at least a portion of the network including a plurality of servers, wherein the portion of the network is associated with a plurality of security metrics, wherein the tree map comprises a plurality of shapes associated with servers from the plurality of servers, wherein a size of shapes in the plurality of shapes are determined in response to a first security metric from the plurality of security metrics associated with the servers, and wherein an appearance of the shapes are determined in response to a second security metric from the plurality of security metrics associated with the servers. A GUI may also include a second portion configured to display a textual display of security metrics from the plurality of security metrics.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIGS. 4A-B illustrates screen shots according to embodiments of the present invention.

DETAILED DESCRIPTION OF THE INVENTION

Figure 1:
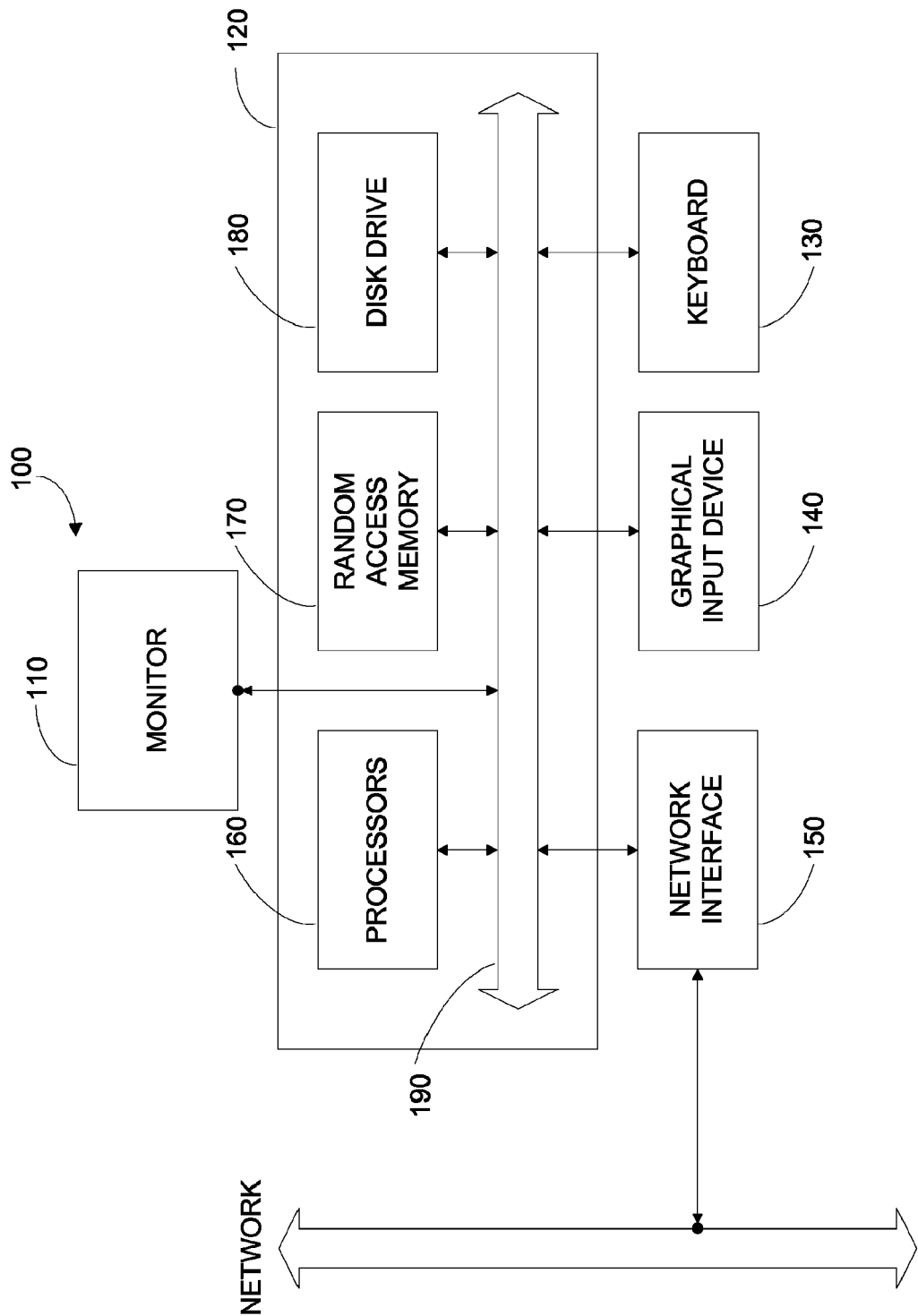
FIG. 1 is a block diagram of typical computer system according to an embodiment of the present invention.

FIG. 1 is a block diagram of typical computer system 100 according to an embodiment of the present invention. In various embodiments, computer system 100 is an analysis server that performs the vulnerability analyses and prioritization described below.

In the present embodiment, computer system 100 typically includes a monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120 or the like.

In various embodiments, computer 120 typically includes familiar computer components such as a processor 160, and memory storage devices, such as a random access memory (RAM) 170, disk drives 180, and system bus 190 interconnecting the above components.

In one embodiment, computer 120 includes one or more Xeon microprocessors from Intel. Further, in the present embodiment, computer 120 typically includes a UNIX-based operating system.

RAM 170 and disk drive 180 are examples of tangible media configured to store data such as configuration files, network topologies, vulnerability databases, embodiments of the present invention, including executable computer code configured to prioritize network vulnerabilities, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™, Core™ microprocessors; Turion64™ or Athlon64™ microprocessors from Advanced Micro Devices, Inc; and the like.

Further, many types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon one or more chips, an auxiliary processing board (e.g. graphics processor unit), or the like.

Figure 2:
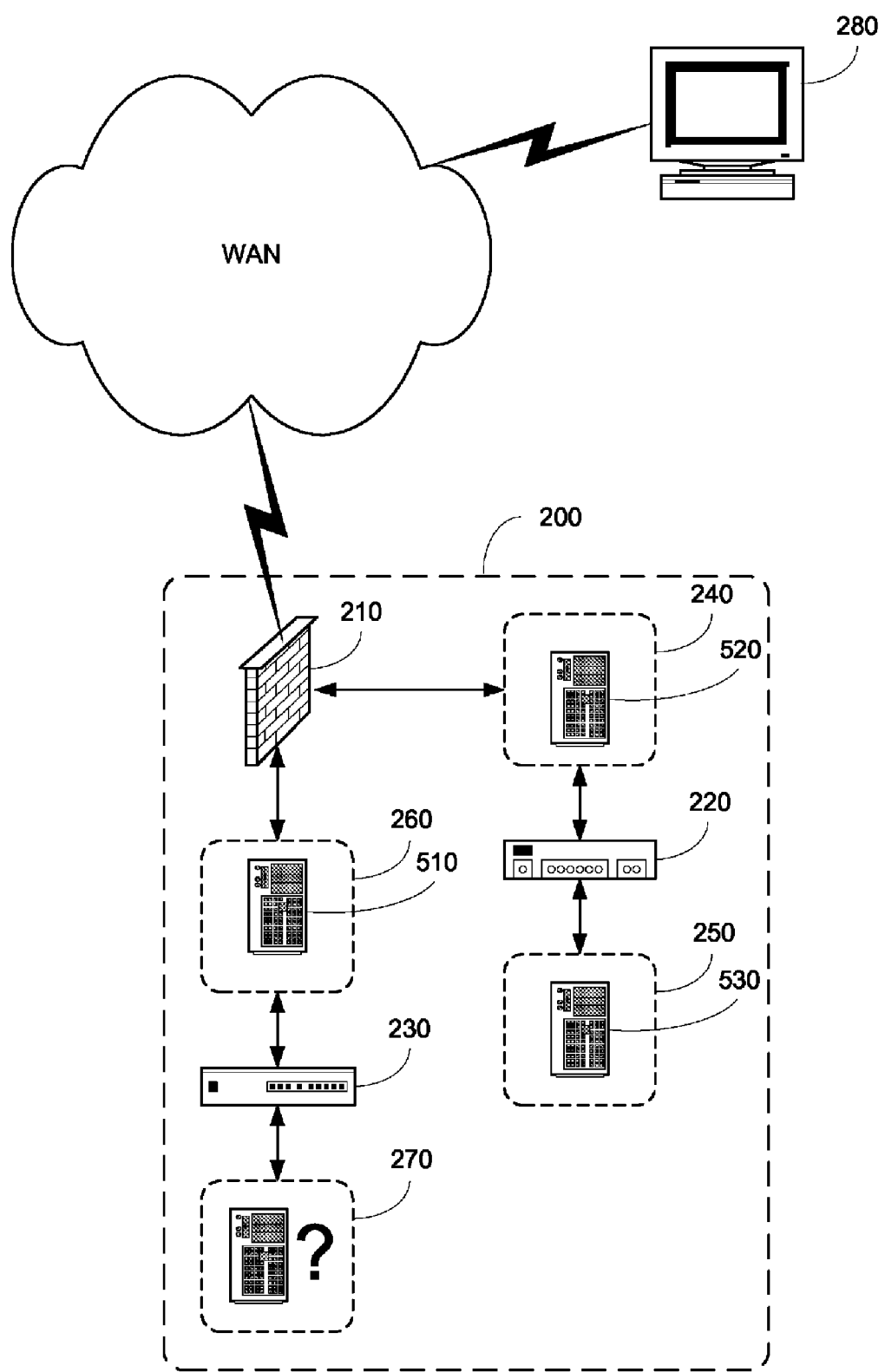
FIG. 2 illustrates an example of an embodiment of the present invention.

FIG. 2 illustrates an example of an embodiment of the present invention. In FIG. 2, a network 200 is modeled including network infrastructure devices 210, 220 and 230. Also shown are host server locations 240, 250, 260, and 270. A server 280 and an analysis server are also illustrated.

In various embodiments of the present invention, network infrastructure devices 210-230 are typically devices such as network routers, firewalls, data bridges, or the like. Network infrastructure devices 210-230 are typically used to route traffic within a network. Accordingly, in other embodiments, network infrastructure devices 210-230 may be embodied in many forms, such as wireless routers, load balancing systems, or the like. In various embodiments, the configurations of network infrastructure devices 210-230 are typically specified by a system administrator. In some embodiments, the configurations may take the form of a configuration file. Some network infrastructure devices 210-230 may have default configurations which can be modified via the system administrator loading a new configuration file. Conversely, configuration files may be downloaded from network infrastructure devices 210-230 for analysis by a system administrator.

In various embodiments, host server locations 240-270 are locations where host application servers may be located. As will be described below, host server locations 240-270 are locations within network 200 where host server machines are predicted to be located, based upon configuration files of network infrastructure devices 210-230.

As will be described below, server 280 is a location from which a system administrator will initially launch one or more attacks from. The location of server 280 may is arbitrary and may represent any server within network 200 or a server outside network 200 (e.g. the internet). In various embodiments, the attack may be any type of network threat such as a virus, a worm, a Denial of Service attack, key logger, spyware, or the like. Such threats are commonly profiled in publicly available threat or vulnerability reference libraries compiled by Computer Associates, McAfee, Cisco, the National Vulnerability Database, or the like.

Additionally, in FIG. 2, an analysis server 290 is illustrated. In various embodiments, analysis server 290 is coupled to network infrastructure devices 210-230 and may be coupled to host server locations 240-270.

Figure 3A:
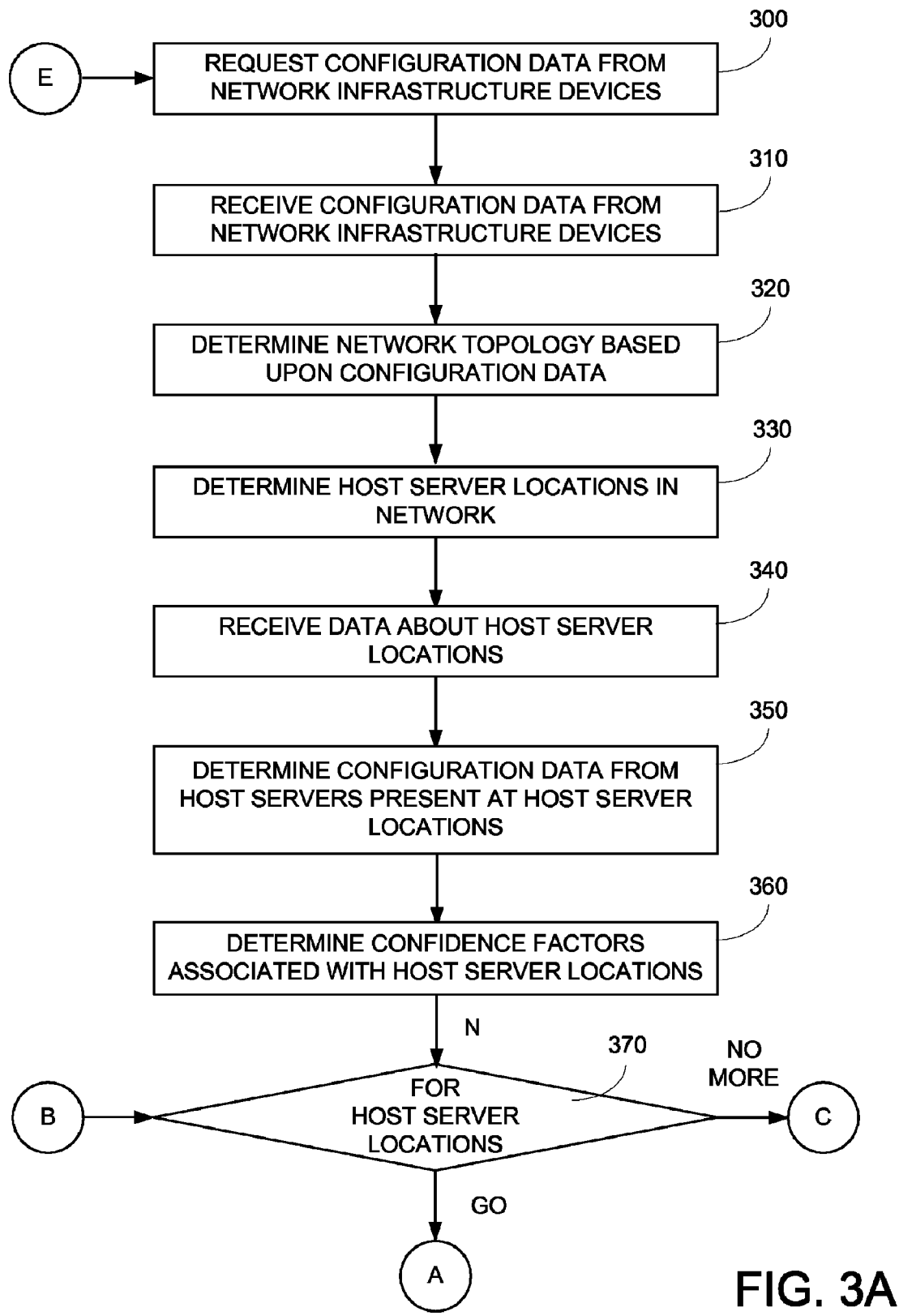
FIGS. 3A and B illustrate a diagram of a flow chart according to one embodiment of the present invention.
Figure 3B:
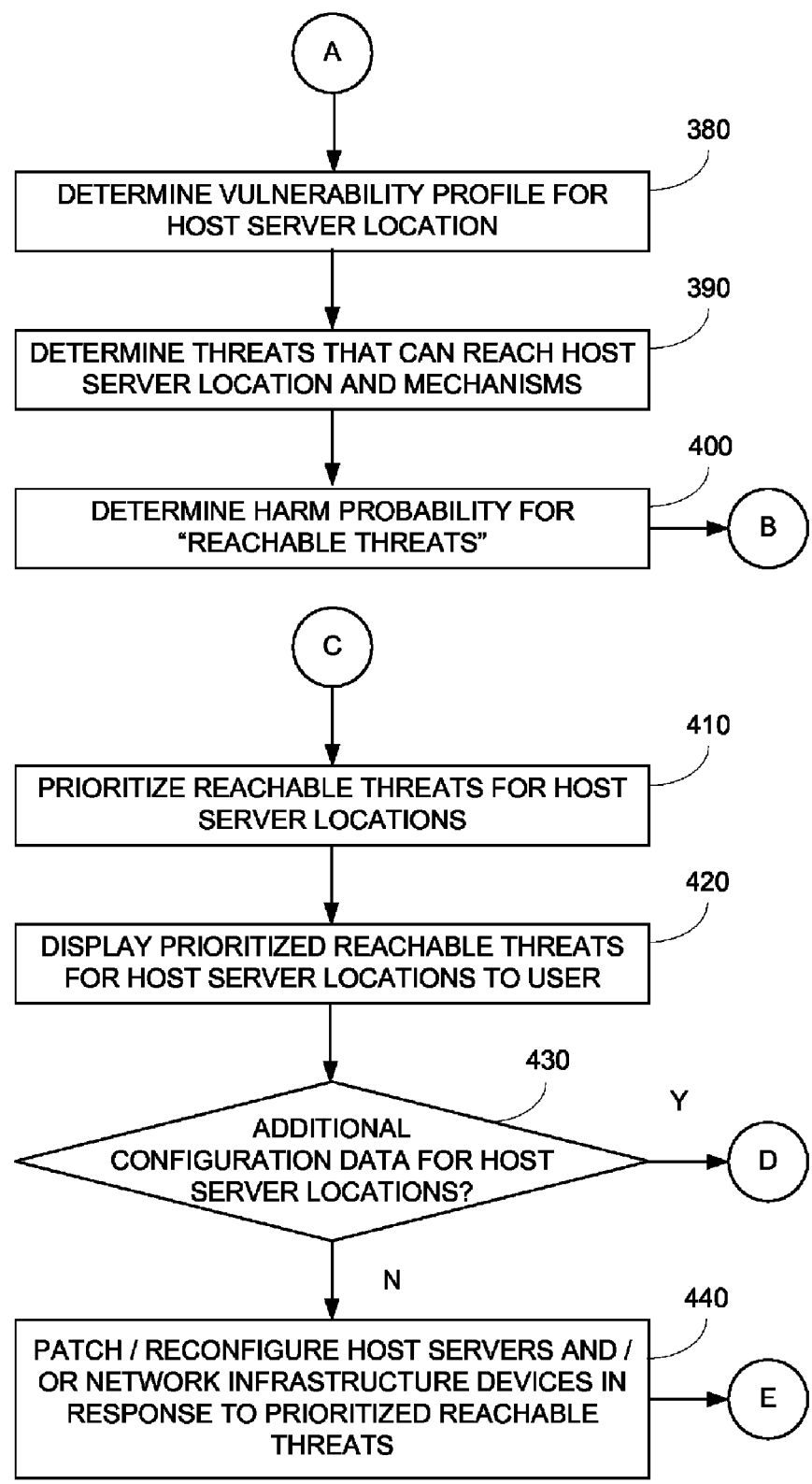

FIGS. 3A and B illustrate a diagram of a flow chart according to one embodiment of the present invention. Description of the embodiment of FIG. 3 is made with respect to the diagram in FIG. 2.

Initially, analysis server 290 requests configuration data (e.g. configuration files) from network infrastructure devices 210-230, step 300. This process may be initiated by a user, or automatically, upon a schedule or an event. Next, configuration data from network infrastructure devices 210-230 is received by analysis server 290, step 310. In various embodiments, a library of threats (e.g. a threat reference library) is also referenced. In other embodiments, such data may have previously been collected, and thus retrieved in these steps.

In various embodiments, based upon the configuration data of network infrastructure devices 210-230, a network topology may be determined, step 320. In other words, based upon the network traffic patterns allowed by network infrastructure devices 210-230, the flow of data within network 200 may be determined.

Additionally, based upon the configuration data, host server locations 240-270 are determined, step 330. In the example in FIG. 2, it can be determined that network infrastructure device 210 is coupled to outside of network 200, to host location 240 and 260, network infrastructure device 220 is coupled to host locations 240 and 250, and network infrastructure device 230 is coupled to host locations 260 and 270.

It should be noted that in various embodiments, the identification of host locations does not imply that an actual host server is present at these host locations. Instead, as above, the host locations are typically identified based upon the configuration data of network infrastructure devices, or the like.

In various embodiments, data about host locations 240-270 may be retrieved, step 340. For instance, data about host locations 240-270 may include whether a host machine is actually present at host locations 240-270. In various embodiments, the presence of host machines may be indicated by a user via a questionnaire, via a network discovery module, via an asset management system, via a network netflow or sniffer device, patch management system, or the like. As another example, data may include system maintenance practices, a vulnerability management system, or the like of the user. For instance, data may include how often does the user push out software patches, software policy (e.g. only Microsoft products), software licenses, service plans, and the like. Similar to the above, such data may be indicated by a user via a questionnaire, via a policy file, or the like.

Additionally, in various embodiments, if a host machine is present, specific configuration data may also be received from host machines (e.g. host servers), step 350. For instance, partial or complete hardware and software configurations of host servers may be returned. As examples, the specific configuration data may include and indication of network addresses (e.g. IP addresses) associated with the host servers, which ports, if any are monitored by the host servers, which applications (including operating system) are running on the host servers and monitoring the ports, which versions of the applications are running, and the like. In various embodiments, other similar types of information may also be determined. This data may be indicated by a user via a questionnaire, via querying of a host machine, or the like.

In various embodiments of the present invention, various levels of configuration information regarding a host server location may be determined, for example, the existence of a host server at the host server location, the existence of specific applications of a host server at the host server location, ports monitored on a host server at the host server location, confirmation of vulnerabilities of a host server at the host server location, identification of software patches applied to a host server at the host server location, potential vulnerabilities, confirmed vulnerabilities, and the like. In various embodiments, the amount of this configuration information known about a server is translated into a "coverage factor score" (CFS). For example, if 40 of 100 pieces of data regarding a host server are known, the CFS may be 0.4, and integer, or the like. In various embodiments, if a CFS is below a specified level, for example 10%, too many presumptions (90%) to the configuration of the host server have to be made for a given host server. Accordingly, the security risk score for the host may be ignored when considering remediation, quantization of risk, or the like.

In various embodiments, the knowledge, or lack of knowledge of the above information are used to determine a confidence factor (vulnerability certainty) of host servers. In various embodiments of the present invention, a confidence factor is then associated with each of host server locations 240-270, step 360. The confidence factor may be determined based upon how much is known or confirmed about a host server at the specific host server location, as discussed above.

As an example, if a host server 510 is present at host server location 260, and the full software configuration is known and entered, host server location 260 may be associated with a high confidence factor (e.g. 0.90 in a 0 to 1 scale). Further in this example, if it is unknown whether a host server is present at host server location 270, host server location 270 may be associated with an initial confidence factor that is low (e.g. 0.10 from 0 to 1). In various embodiments of the present invention, since host server location 270 is "downstream" from host server location 260, the confidence factor for host server location 270 is also based upon the confidence factor of host server location 260. In one example, if the confidence factors are multiplied, the confidence factor for host server location 270 is equal to 0.09 (0.09=0.90×0.10). In other embodiments, other types of combination, including weighted combinations are contemplated.

Continuing the example, if a host server 520 is present at host server location 240, but nothing more about host server 520 is entered, host server location 240 may be associated with a lower confidence factor (e.g. 0.25 from 0 to 1). Further in this example, if it is unknown whether a host server is present at host server location 250, host server location 250 may be associated with an initial confidence factor that is low (e.g. 0.10 from 0 to 1). Again, since host server location 250 is "downstream" from host server location 240, the confidence factor for host server location 250 is also based upon the confidence factor of host server location 240. In one example, the confidence factors are multiplied, the confidence factor for host server location 250 is equal to 0.025 (0.025=0.25×0.10). Again, in other embodiments, other types of combination, including weighted combinations are contemplated.

Next, a first host server location is selected, step 370. In various embodiments, host server locations are prioritized based upon closeness to server 280, the original attack source.

Next, a vulnerability profile for the host server location is determined, step 380. In various embodiments, the vulnerability profile is determined by the type of network traffic pattern that is allowed to flow to the host server. Further, the vulnerability profile is determined by the data about the host application server determined in step 340, for example if a host server is present or not, and the like. Still further, the vulnerability profile is determined by any configuration data associated with the host application server determined in step 350, or lack thereof.

As an example, referring to FIG. 2, the type of network traffic allowed from network infrastructure device 210 to host server location 260 may be TCP data. Further, in this example, host server 510 is known to be present at host server location 260. Still further, in this example, host server 510 is known to run an Apache HTTP server, and the like. Accordingly, the vulnerability profile for host server location 260 is determined from these types of data: TCP traffic, Apache HTTP server.

As another example, the type of network traffic allowed from network infrastructure device 210 to host server location 240 may also be TCP data. In this example, host server 520 is known to be present at host server location 240, however, no other configuration details regarding the configuration of host server 520 is known. In various embodiments, when configuration data is missing, it is assumed that host server 520 includes virtually all possible combinations of software, etc. In this simple example, it is assumed host server 520 runs an Apache HTTP server, a Microsoft Web server, or the like. It should be understood that many other types of configuration data may also be assumed, for example, many different versions of software (e.g. Oracle 9i and 11i databases, Microsoft SQL server 2000, 2005; or the like). In some embodiments, the range of applications assumed and the versions assumed can be limited by the user. In sum, in this example, because nothing is known about host server 520, various embodiments assume a wide range of data within the vulnerability profile.

In embodiments of the present invention, based upon the vulnerability profile, one or more threats from the library of vulnerabilities (threats), discussed above, are identified, along with their mode of attack, step 390. This step may also be referred to as determining reachability of threats or vulnerabilities to the host server location. In various embodiments, the reachability also refers to leapfroggable vulnerabilities.

In various embodiments of the present invention, the reachability data is incorporated into a threat map. In such embodiments, the threat map may be generated and displayed to a user as a directed graph having nodes representing subnets, and a root node representing a threat server. The reachability of the threat server to the host server location, discussed above, is reflected by the paths between the host server location and the threat server. In addition, in various embodiments, in the threat map, each node is associated with a known or presumed vulnerability of a host server location or subnet. For example, if nine out of ten pieces of configuration data are known for a host server, a worse-case presumption is made for the tenth piece of data. As an example, if version 1.0 of an application is vulnerable to an attack, but version 1.1 of an application in a host server is not vulnerable, and the specific version for a host server has not been determined, a presumption is made that the version of the application is 1.0.

Following this step, a "harm probability" or "vulnerability certainty" is determined for the threats that are reachable, step 400. In various embodiments, harm probability may be determined based upon the harm probability specified for these threats (e.g. parameters or attributes of the threats). These attributes can typically be determined from the library of vulnerabilities. For instance, for threats that are relatively easy to implement, a harm probability may be high (e.g. 0.5 on a 0-1.0 scale; and for threats that are very difficult to implement (e.g. requires many events to occur), a harm probability or attribute may be low (e.g. 0.1 on a 0 to 1.0) scale. In additional embodiments, a severity of harm may also be determined from the threats that are reachable. For example, the severity may be low, if the threat can perform a ping, however, the severity may be very high, if the threat can get root access.

In various embodiments, as is discussed, the vulnerability certainty value for a host server may depend upon the amount of configuration data known about the host server or conversely, the amount of presumption of configuration data that is required (e.g. the coverage factor score). In various embodiments, the vulnerability certainty value is also determined in response to how vulnerable the host server is to a given vulnerability, given vulnerability attributes versus known configuration data of the host server. As an example, the coverage factor score may indicate that all configuration data of a host server is known, but given that configuration, the host server is not vulnerable to a threat. In such a case, the vulnerability certainty may be low. As another example, the coverage factor score may indicate that only half of the configuration data of a host server location is known, and presuming additional configuration data, the host is vulnerable to a threat. In such a case, the vulnerability certainty may be medium. As yet another example, the coverage factor score may indicate that almost all of the configuration data of a host server location is known, and presuming additional configuration data, the host is vulnerable to a threat. In such a case, the vulnerability certainty may be high.

In embodiments where more than one vulnerability may reach a target host server location, the harm probabilities of the vulnerabilities may be combined. For instance if threat A has a harm probability of 0.5 and threat B has a harm probability of 0.5, a combined harm probability for the host server location may be 0.75, for example. In various embodiments, many ways of combining multiple harm probabilities are also contemplated. In some embodiments, the severity of multiple threats reaching a target host server location may simply be the highest severity of the multiple threats, or a combination.

In the example in FIG. 2, for host server 510, the vulnerability profile includes TCP traffic and an Apache server. In this step, only a very difficult to exploit vulnerabilities from the library of vulnerabilities is identified that uses TCP as a protocol to attack Apache servers. In this example, the harm probability may be 0.1 from a range of 0 to 1.0 for example. Additionally, in this example, the attack may simply crash the host server 510, the severity may be 0.5 from a range of 0 to 1.0.

In the case of host server 510, the vulnerability profile includes TCP and a large number of assumed applications and versions. In this step, many easy to exploit vulnerabilities from the library of vulnerabilities are identified that use TCP as a protocol to attack applications such as: Oracle 9i and 11i databases, Microsoft SQL server 2000, 2005; or the like. In this example, the combination of the harm probabilities may be high, for example 0.9 from a range of 0 to 1.0, for example. In this example, the reachable vulnerability with the highest severity can obtain root access, accordingly, the severity may be 0.9 from a range of 0 to 1.0.

In various embodiments of the present invention, the process may be repeated for other host server locations that may be reachable by threats or vulnerabilities. In some embodiments, multiple threats may be used to penetrate a network via "leapfrogging" host servers. More specifically, host server locations can become a source of a threat within a network. In various embodiments, a leapfrogging analysis may repeat until the confidence factors decreases below a given threshold.

As an example, as discussed above, host server 520 is assumed to have many vulnerabilities able to reach it from server 280. Further, at least one such reachable vulnerability provides root access. Accordingly, host server 520 may then serve as a source of attack within the rest of network 200.

In this example, using the steps described above, it is first determined that a host server 530 is present at host server location 250. However, not much else is known about host server 530. Accordingly, similar to host server 520, the harm probabilities may be 0.9 and the severity may be 0.9. An initial confidence factor may be 0.25, similar to host server 520. However, since an attack on host server 530 depends upon an attack on host server 520, in various embodiments, the initial confidence factor may be combined with the confidence factor of host server 520. For example the confidence factor for host server 530 may be the product of the two confidence factors, e.g. 0.06, or any other combination of the confidence factors. In light of this, if a sophisticated attack on a network relies upon successive control of many servers, for example, smaller confidence factors are determined for servers further down the attack chain. As discussed, the process may continue until the confidence factors drop below a defined threshold. In other embodiments, the process may continue until any other factor is satisfied. For example, until a given percentage (e.g. 75%, 100%) of the host server locations have been analyzed, until a given number (e.g. 100) vulnerable host server locations have been identified, or the like.

In some embodiments of the present invention, after the process above, harm probabilities, severities, and confidence values for each host server location in a network can be determined. Typically, after this process is run upon a network, multiple host server locations may be associated with a high harm probability and a high severity.

In various embodiments, a "security risk score" (SRS) may be determined for host servers based upon business value of the host server and upon threat likelihood. In various embodiments, threat likelihood is determined based upon a number of factors such as, reachability of the threat to the host server; how recent or novel the vulnerability is (including vulnerability of the underlying components, dependency of the vulnerability, patches available, and the like); the severity of the vulnerability; difficulty of the vulnerability, and the like.

Accordingly, vulnerabilities of the host server locations can be prioritized, step 410, and graphically displayed to the user, step 420 (as will be described further below). In some embodiments of the present invention, the SRS, described above is a metric used in prioritizing or highlighting the vulnerabilities, and/or the remediation actions.

In various embodiments, to help the user prioritize, a number of other factors may be provided about the host server locations/host servers. In one embodiment, an "asset value" or "business value" may be assigned to a host server. For example, a host server with confidential client data may be assigned a high asset value (initially by the user), and a host server with web graphics data may be assigned a lower asset value, e.g. 20 from 0 to 100. In some embodiments, the harm probability may be combined with the asset value to obtain an "exposed risk." In one example, the exposed risk is simply the product of the two.

In the example in FIG. 2, the asset value of host server 510 is 90, and the harm probability 0.1, thus the exposed risk is computed to be 9; and the asset value of host server 520 is 50 and the harm probability is 0.9, thus the exposed risk is computed 40. Thus, according to one embodiment, host server 520 would be prioritized before host server 510.

In various embodiments, if the associated confidence value is low for particular "reachable threats," the user may enter additional configuration data about the host server locations, step 430. Accordingly, in response to the prioritization, the user may obtain more information, to make a more informed decision about the network. As an example, for a first server location the exposed risk is 60 and a first confidence factor is 0.90 and for a second server location the exposed risk is 80 and a second confidence factor is 0.50. In such an example, the second server location may be prioritized before the first server location. As the second confidence factor is low (0.50), a first course of action may be the user determining more about the configuration of the host server location. For example, the second confidence factor may be a result of not knowing or not entering the list of applications running on a host server located at the host server location. In response, the user may run a software inventory of the host server, and enter that data into embodiments of the present invention. When the system is re-run with this additional information, the exposed risk of the second server location may drop, for example to 20, and the second confidence factor may rise, for example to 0.95. This process above may then be repeated until the user is satisfied with the level of confidence for some or all of the host server locations.

In various embodiments, a user may otherwise begin patching/fixing the vulnerabilities for the prioritized host application locations, step 440. As is known, the user may install a patched version of one or more applications on a host server, the user may close ports on the host server, the user may change application software on the host server, or the like. Additionally, in various embodiments, this process may include patching or changing the configuration of particular network infrastructure devices.

In various embodiments, the process allows the user to supplement the system with additional configuration data or making changes to network infrastructure devices or host servers to address the prioritized vulnerabilities (e.g. install a firewall or filtering device, changing rules or policies, or the like.) The process above may be repeated to allow the user to address the next prioritized vulnerability, or the like. As discussed previously, the priority may be based upon a combination of many factors including value of data stored on a host server, an "exposed risk" (harm probability*value), whether the vulnerability is exploitable (e.g. root access), what level of data access is provided, and the like.

Figure 4A:
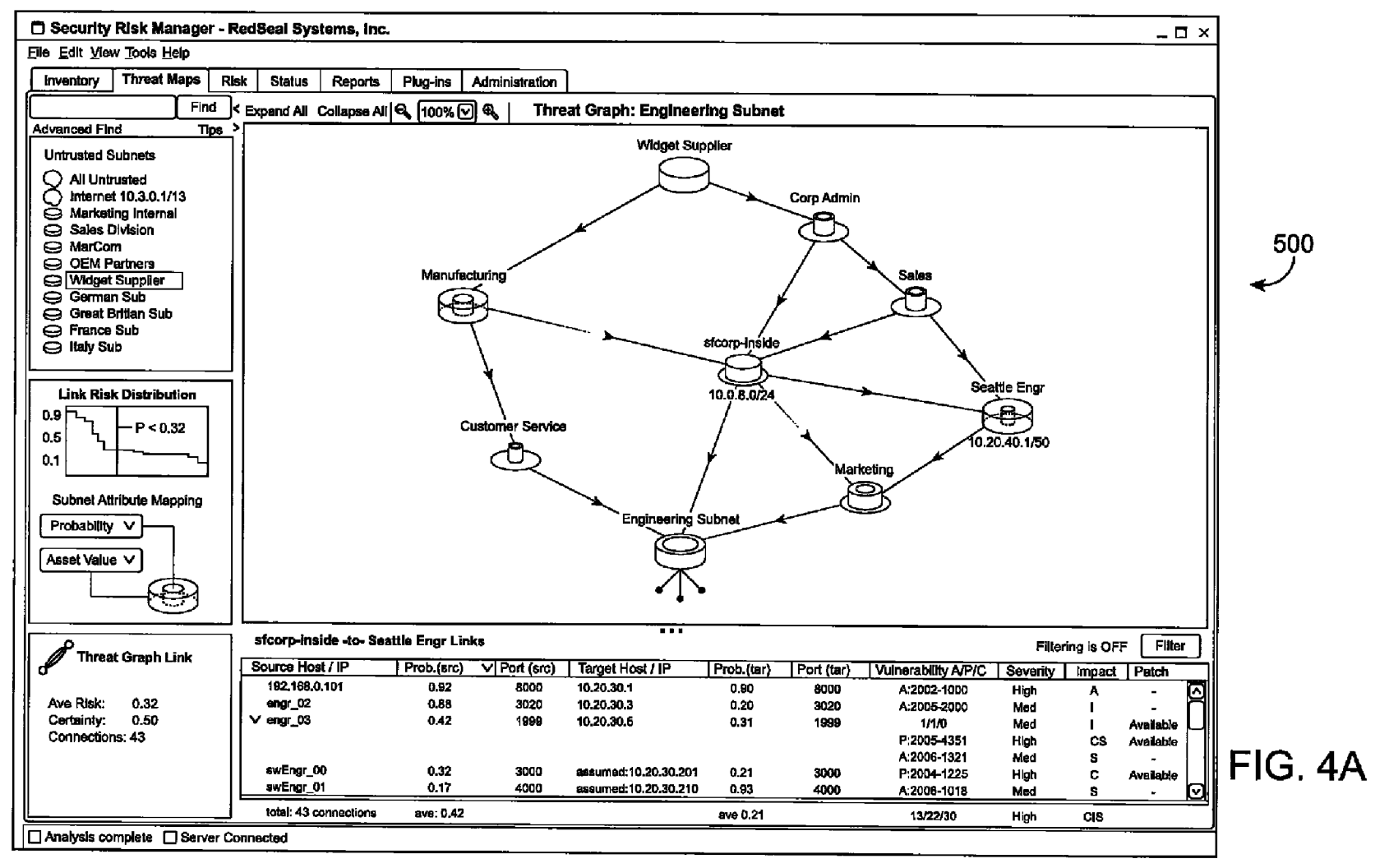
Figure 4B:
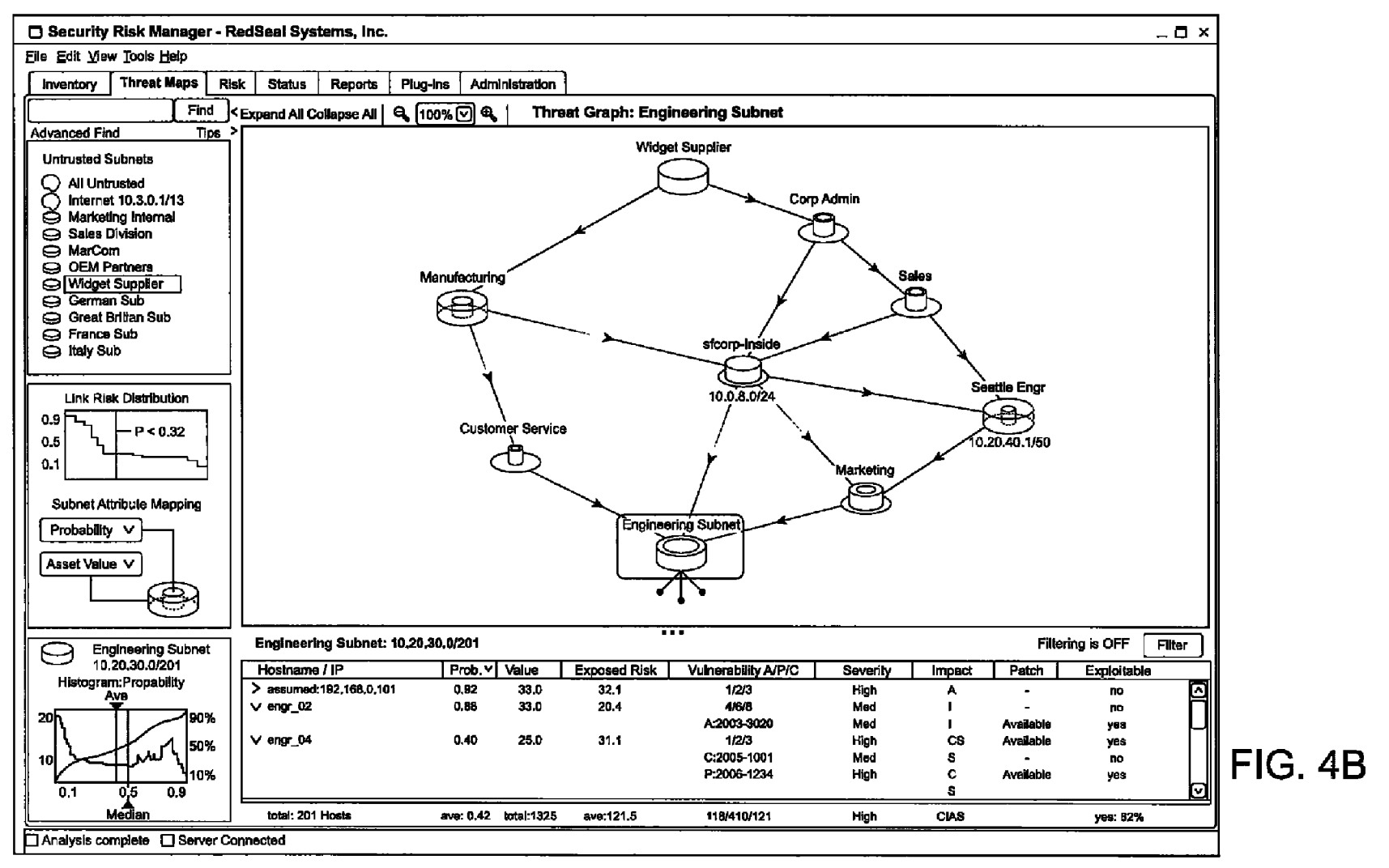

FIGS. 4A-B illustrates screen shots according to embodiments of the present invention. More specifically, FIGS. 4A-B illustrate exemplary graphical user interfaces that allow a user to view threats within a network, as referred to in step 420, above.

FIG. 4A illustrates a threat graph (threat map) 500 of a portion of a network. In this example, the link risk distribution illustrates a plots harm potential (risk) versus number of servers. As is illustrated, the average harm potential for the network is 0.32. As is also illustrated, any number of ways to graphically illustrate data are enabled by this GUI. As shown, harm potential (probability) is illustrated by a red cylinder. In this example, the diameter of the red cylinder represents the harm potential, the diameter of the gray cylinder represents the asset value, and the greater the respective diameters, the greater the harm/value. For instance "widget supplier" servers have a large gray cylinder, and a red cylinder filling up the same cylinder, accordingly, this visually indicates that the widget supplier servers are very valuable and very vulnerable. In another example, the "Seattle Engr" servers are valuable, but is not as vulnerable to threats. As yet another example, the "customer service" servers are not very valuable and not very vulnerable.

In the example in FIG. 4A, links are shown connecting servers in the portion of the network. In various embodiments of the present invention, the thickness and/or color of the links may represent the confidence value of the source server. For example, if confidence in the configuration of a source server is high, a connecting line may be heavy, and if confidence in the configuration is low, the connecting line may be thinner.

In the present example, a link between "sfcorp-inside" server to "seattle engr" server has been highlighted and detailed in text below the image. As illustrated, many types of data may be presented to a user, for example, the source IP addresses, harm probabilities ("Prob.") of different vulnerabilities on the source host servers, the attack mechanism ("Port"), the target host IP address, harm probability ("Prob.") of the different vulnerabilities on the target host servers, "A/P/C" vulnerabilities, discussed below, severity of the vulnerability, impact of the vulnerability, discussed below, whether a patch is available for the vulnerability, and the like.

In various embodiments; A/P/C summarizes the vulnerability in response to what is known about the host configuration. A represents assumed harm, P represents presumed harm, and C represents Confirmed harm. In this example, the less that is known about a host server, the higher the Assumed harm, and the more that is known about the host server, the lower the Assumed harm. However, the more that is known about the host server, the presumed or confirmed harms may be higher or lower, with respect to a given vulnerability. In the example, for source host at IP address 192.168.0.101, the assumed harm may be identified specifically by identifier, such as A:2002-1000. Additionally, the harm may be identified by class, for example for engr_03 server, the A/P/C counts are 1/0/0, respectively.

In various embodiments the type of impact are "CIAS." As is known, C stands for the ability to reach confidential data (e.g. break-in), I stands for the ability to affect the integrity of the server (e.g. delete data), and A stands for the ability to affect the availability of the server (e.g. crash).

FIG. 4B illustrates a case where more information of "Engineering subnet" is displayed to the user. As is shown, another field that may be displayed to the user is an "exploitable" field. In various embodiments, this represents whether a threat may obtain root access to the target server. In cases where a threat is exploitable, the target server may serve as a basis for additional attacks within the server.

Additionally, shown in FIG. 4B is a histogram of harm probabilities of servers within the engineering subnet. As can be seen, the median harm probability is 0.5, and many servers within the subnet have harm probabilities in the range of 0.80 to 0.90. This histogram reports that many host servers are vulnerable to threats, and is not a desirable situation. To a user, it would indicate that corrective action for those servers is required.

In additional embodiments of the present invention, the above process may be run on the network before and after a change to the network, and the changes in vulnerabilities may be highlighted or detailed. For example, after the system is run a first time, the user enters additional data about a host server, and the system is run again. Based upon the additional data, the user may either see the new vulnerability state of the network, or the delta, the change in vulnerability state of the network. As an example, the user can see that the new information decreases the harm probability of the host server and other servers. As another example, based upon a first run of the system, the user sees that a host server is vulnerable, and decides to patch the host server. Running the system again, the user may see the effect of the patch is that the host server harm probability is lowered, but the harm probability of three other servers greatly increases. In such a case, the user may decide to push out the patch, and to also install an additional firewall in front of the three servers; alternatively, the user may decide any other way to address the vulnerability.

In other cases, other types of changes include changes to the network, new vulnerabilities discovered, and the like. These effect of these changes may also be reflected as a change in network vulnerabilities. For example, the user may update the given "value" of an asset, a new set of worms may be discovered, a new network infrastructure device is added to the network, a new application is added "upstream" from a vulnerable host server location, a certain amount of time has passed (e.g. one week, one month) or the like.

Embodiments of the present invention provide visualization of network-wide risk analysis in the form of a graphical user interface with customizable at-a-glance views of the network. In various embodiments, the nodes of the network that have the highest probability of exposure to known vulnerabilities may be indicated in red, for example. Other configurations of the GUI enable the user to quickly ascertain whether any server in a network is exposed to specific threats.

Figure 5A:
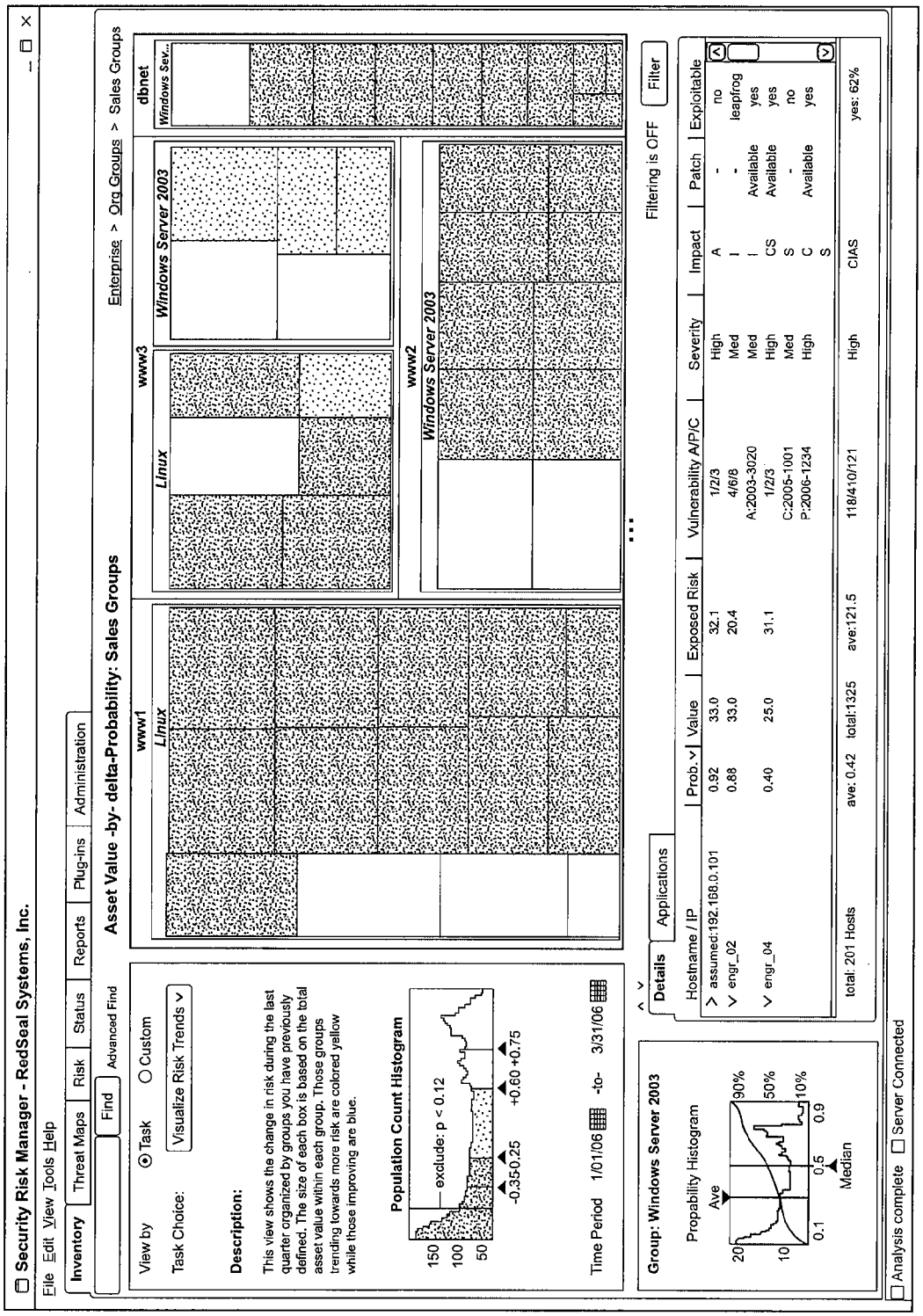
FIGS. 5A-C illustrates additional screen shots according to other embodiments of the present invention.
Figure 5B:
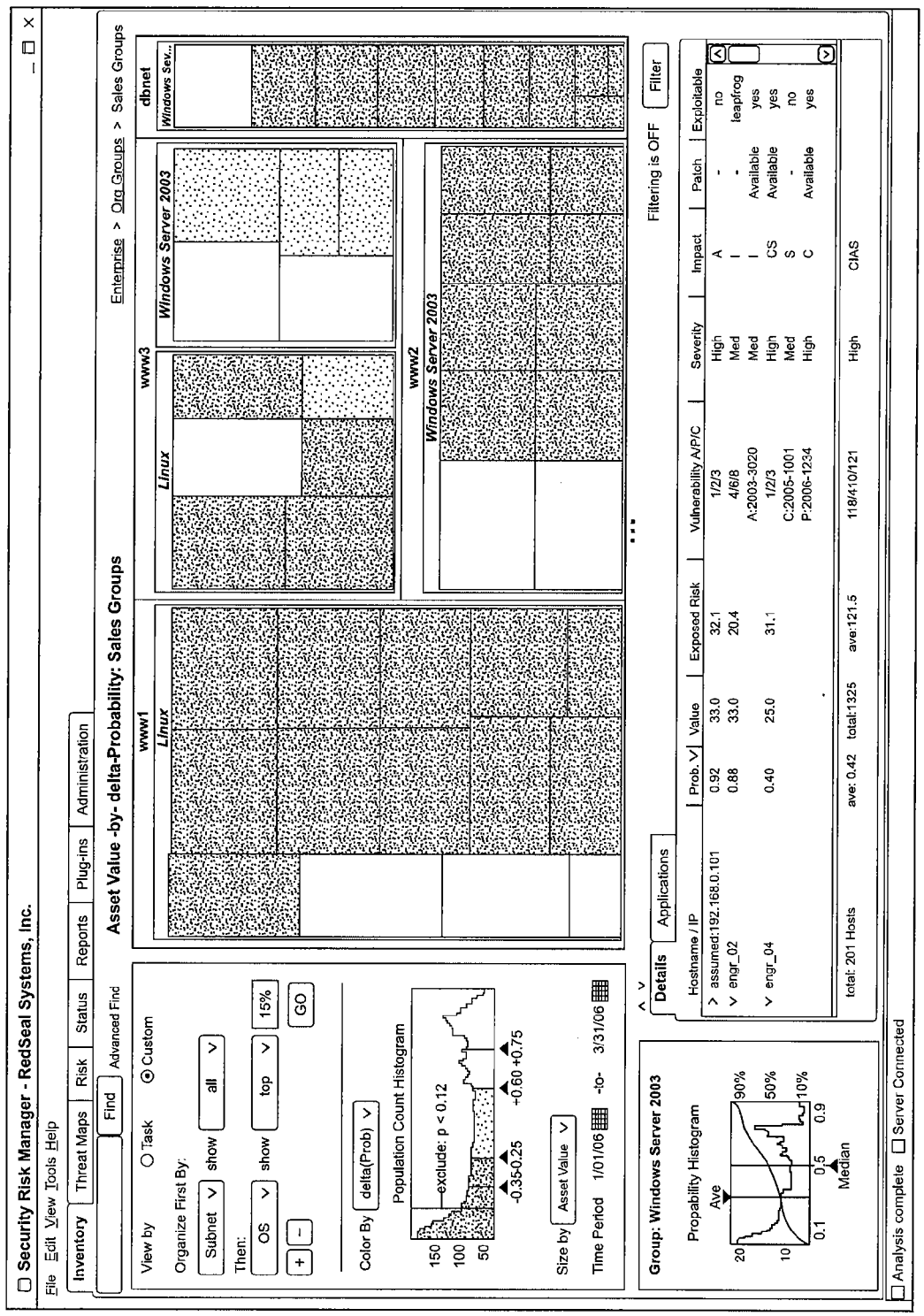
Figure 5C:
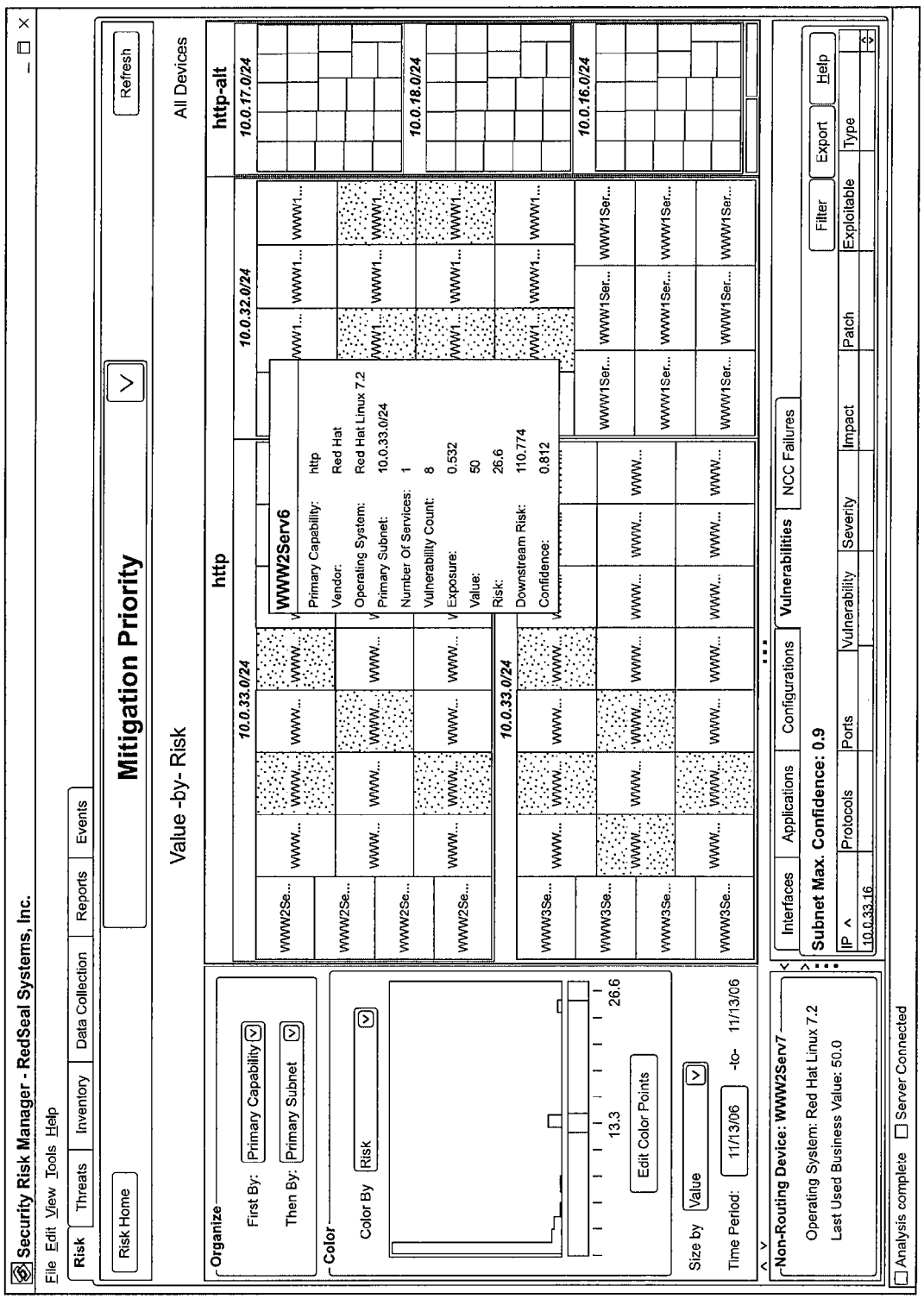

FIGS. 5A-C illustrates additional screen shots according to other embodiments of the present invention. More specifically, FIGS. 5A-C illustrate exemplary graphical user interfaces that allow a user to view threats within a network, as referred to in step 420, above. As can be seen in FIGS. 5A-C, the inventor has adapted the concept of "tree maps" to the visualization of network vulnerabilities. As is known with "tree maps" portions of data that are of interest to a user may be magnified, while other portions are less magnified. For example, a first icon within the tree maps may be larger than a second icon indicating importance of a server represented by the first icon over a server represented by the second icon.

In various embodiments of the present invention, "importance" may depend upon the criteria specified by the user. For example, the user could specify importance as servers having the highest security risk score, servers having the highest business value, servers having the greatest increase in security risk score over a given time period, servers having the highest vulnerability certainty, deltas of the above values, and the like. Other criteria and combinations thereof are contemplated. In the example in FIG. 5B, the sizes of the nodes within the tree maps are determined in response to "Asset Value" of the nodes.

In some embodiments, the shape of the icons may be different. For example, more important icons may be shaped as a letter "X," or skull-and-bones, or the like, and less important icons may be shaped as the letter "O," a check-mark, or the like. In other embodiments, the color and steadiness of the icons may also reflect the above factors. As an example, an important icon may be red in color and/or blink (the rate of blinking may also depend upon the importance, as defined by the user specified criteria), whereas a less important icon may be yellow or green in color and/or be steady.

The examples in FIGS. 5 A-B may illustrate the affect of network changes between two different time periods, the affect of proposed changes to a network, the current or proposed vulnerabilities of the network or the like. For example, the change in vulnerability of the network before and after a patch, update, or the like, has been pushed out, giving the user feedback as to the new vulnerability state of the actual network, or the predicted vulnerability state of the network. Interestingly, because the change in vulnerabilities of the network can be visualized, the user can determine why a patch, update, or the like affects the network in the way indicated. For example, upgrading software to another version may open a host server up to a new set of vulnerabilities.

In this example, FIGS. 5A-C represents changes or proposed changes with respect to time. Such GUIs may allow the user to spot trends in security over time. Additionally, such GUIs may also allow the user to see the result of specific changes in the network. For example, an original risk tree map can be determined, a new network component can be added to the network (e.g. a firewall), and a new tree map can be determined. In such an example, the user may compare the original tree map to the new tree map to see the effect of the new network component. For example, at-a-glance, the user can see that certain nodes are now blue in color, indicating that the security risk score, for example, has improved and the network is more secure. In other embodiments, a network change may result in network security deteriorating. This may be reflected, at-a-glance, to the user, by certain nodes in the tree map being red in color.

The graph at left represents the change in harm probability with respect to count. In this graph, a positive (e.g. +0.60) number represents increase in harm probability, and is typically undesirable, and a negative number (e.g. −0.35) represents a decrease in harm probability, and is desirable. As can be seen, the yellow portion of the graph shows that that the vulnerability of the network has increased. In various embodiments, this may occur when new viruses, worms, or the like are released. In this example, in the main section, subnets are color-coded according to change in harm probability. Further, relative sizes of the boxes are used to represent asset value (value) of the host servers. With this GUI, the user may quickly focus upon those host servers that are most likely affected by either a change in network configuration, or the like.

In the example in FIG. 5C, a GUI is shown that illustrates remediation prioritization to a user. In this example, the sizes of the nodes in the tree map are determined by business value, and may be organized by user-selected criteria. For example, the tree map is organized by primary capability then by subnet. In this GUI, a lighter red color indicates vulnerabilities that are suggesl lted to be mitigated first. For example, the light red color indicates a higher security risk score (a higher security risk).

In various embodiments of the present invention, the GUI may display user-selected tree maps, as illustrated in FIG. 5A, or highly-user-customized tree-maps, as illustrated in FIG. 5B. As illustrated in the embodiments in FIGS. 5A-B, GUIs may also provide textual representations of information displayed. In these examples, the GUIs illustrate a "histogram" of data: server population count versus a user defined metric. For example, in FIG. 5A, the histogram represents the server population count versus trends in risk (over a defined time). In this GUI, at a glance, the user can see if whether the network security is improving (a positive value) or is getting worse (a negative value). In FIG. 5C, the histogram represents node count versus security risk score.

In various embodiments, in addition to the default information displayed to the user, the user may drill-down by selecting a node within the tree map. In response, more detailed information regarding the configuration of the subnet, server, or the like may be presented to the user. An example of this is illustrated in FIG. 5C, with the pop-up window on top of the tree map.

Further embodiments can be envisioned to one of ordinary skill in the art after reading this disclosure. In other embodiments, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system including a display comprising:

determining a plurality of security metrics associated with a plurality of servers within a network;

displaying a tree map on the display representing at least a portion of the network;
wherein the tree map comprises a plurality of shapes associated with servers from the plurality of servers;
wherein a size of shapes in the plurality of shapes are determined in response to a first security metric from the plurality of security metric associated with the servers;
wherein an appearance of the shapes is determined in response to a second security metric from the plurality of security metrics associated with the server; and
wherein the first security metric is selected from a group consisting of: a business value associated with a server location, certainty of a vulnerability, severity of a vulnerability, freshness of a vulnerability, market share of components, difficulty of vulnerability, mitigation priority, risk, and exploitability.

2. The method of claim 1 wherein the first security metric represents a change of a value with respect to time.

3. The method of claim 1 further comprising:
receiving a selection of a shape from the plurality of shapes; and
simultaneous with displaying the tree map, displaying configuration data associated with a server associated with the shape that was selected.

4. The method of claim 1 further comprising displaying a histogram representing vulnerability certainty of the plurality of servers within the network.

5. A method for a computer system including a display comprising:
determining a plurality of security metrics associated with a plurality of servers within a network;
displaying a tree map on the display representing at least a portion of the network;
wherein the tree map comprises a plurality of shapes associated with servers from the plurality of servers;
wherein a size of shapes in the plurality of shapes are determined in response to a first security metric from the plurality of security metric associated with the servers;
wherein an appearance of the shapes is determined in response to a second security metric from the plurality of security metrics associated with the server;
wherein the appearance comprises color of a shape; and
wherein the second security metric is selected from a group consisting of: a business value associated with a server location, certainty of a vulnerability, severity of a vulnerability, freshness of a vulnerability, market share of components, difficulty of vulnerability, mitigation priority, risk, and exploitability.

6. A method for a computer system including a display comprising:
determining a plurality of security metrics associated with a plurality of servers within a network;
displaying a tree map on the display representing at least a portion of the network;
receiving a selection of a shape from the plurality of shapes; and
simultaneous with displaying the tree map, displaying configuration data associated with a server associated with the shape that was selected;
wherein the tree map comprises a plurality of shapes associated with servers from the plurality of servers;
wherein a size of shapes in the plurality of shapes are determined in response to a first security metric from the plurality of security metric associated with the servers;
wherein an appearance of the shapes is determined in response to a second security metric from the plurality of security metrics associated with the server; and
wherein the configuration data is selected from a group consisting of: vulnerability data, port data, application data, patch data, vulnerability certainty, business value, business value, exploitability, downstream risk.

7. A computer system comprising:
a display device configured to generate a graphical user interface, the graphical user interface comprising:
a first portion configured to display a tree map on the display device of the computer system representing at least a portion of a computer network including a plurality of server devices, wherein the portion of the network is associated with a plurality of security metrics, wherein the tree map comprises a plurality of shapes associated with servers from the plurality of server devices, wherein a size of shapes in the plurality of shapes is determined in response to a first security metric from the plurality of security metrics associated with the server devices, and wherein an appearance of the shapes is determined in response to a second security metric from the plurality of security metrics associated with the servers; and
a second portion configured to display a textual display of security metrics from the plurality of security metrics on the display device;
wherein the first security metric is selected from a group consisting of: a business value associated with a server location, certainty of a vulnerability, severity of a vulnerability, freshness of a vulnerability, market share of components, difficulty of vulnerability, mitigation priority, risk, and exploitability.

8. The computer system of claim 7 further comprising a third portion configured to display a histogram representing vulnerability certainty of the plurality of servers within the network.

9. A computer system comprising:
a display device configured to generate a graphical user interface, the graphical user interface comprising:
a first portion configured to display a tree map on the display device of the computer system representing at least a portion of a computer network including a plurality of server devices, wherein the portion of the network is associated with a plurality of security metrics, wherein the tree map comprises a plurality of shapes associated with servers from the plurality of server devices, wherein a size of shapes in the plurality of shapes is determined in response to a first security metric from the plurality of security metrics associated with the server devices, and wherein an appearance of the shapes is determined in response to a second security metric from the plurality of security metrics associated with the servers; and
a second portion configured to display a textual display of security metrics from the plurality of security metrics on the display device;
wherein the appearance comprises color of a shape; and
wherein the second security metric is selected from a group consisting of: a business value associated with a server location, certainty of a vulnerability, severity of a vulnerability, freshness of a vulnerability, market share of components, difficulty of vulnerability, mitigation priority, risk, and exploitability.

10. The computer system of claim 7 further comprising user-selectable regions on the tree map;
wherein the graphical user interface also includes a third portion configured to display configuration data associated with a server associated with user-selected user-selectable regions.

11. The computer system of claim 7 wherein the first security metric represents a change of a value with respect to time.

12. A computer system comprising:
a display device configured to generate a graphical user interface, the graphical user interface comprising:
a first portion configured to display a tree map on the display device of the computer system representing at least a portion of a computer network including a plurality of server devices, wherein the portion of the network is associated with a plurality of security metrics, wherein the tree map comprises a plurality of shapes associated with servers from the plurality of server devices, wherein a size of shapes in the plurality of shapes is determined in response to a first security metric from the plurality of security metrics associated with the server devices, and wherein an appearance of the shapes is determined in response to a second security metric from the plurality of security metrics associated with the servers;
said first portion being further configured to receive a selection of a shape from the plurality of shapes and, simultaneous with displaying the tree map, to display configuration data associated with a server associated with the shape that was selected; and
a second portion configured to display a textual display of security metrics from the plurality of security metrics on the display device;
wherein the configuration data is selected from a group consisting of: vulnerability data, port data, application data, patch data, vulnerability certainty, business value, business value, exploitability, and downstream risk.

13. A computer program product including computer-executable code resident on a tangible media comprising:
code that directs the computer system to determine a plurality of security metrics associated with a plurality of servers within a network;
code that directs the computer system to display a tree map on the display representing at least a portion of the network, wherein the tree map comprises a plurality of shapes associated with servers from the plurality of servers, wherein a size of shapes in the plurality of shapes is determined in response to a first security metric from the plurality of security metric associated with the servers, and wherein an appearance of the shapes is determined in response to a second security metric from the plurality of security metrics associated with the servers;
wherein the first security metric is selected from a group consisting of: a business value associated with a server location, certainty of a vulnerability, severity of a vulnerability, freshness of a vulnerability, market share of components, difficulty of vulnerability, mitigation priority, risk, and exploitability.

14. A computer program product including computer-executable code resident on a tangible media comprising:
code that directs the computer system to determine a plurality of security metrics associated with a plurality of servers within a network;
code that directs the computer system to display a tree map on the display representing at least a portion of the network, wherein the tree map comprises a plurality of shapes associated with servers from the plurality of servers, wherein a size of shapes in the plurality of shapes is determined in response to a first security metric from the plurality of security metric associated with the servers, and wherein an appearance of the shapes is determined in response to a second security metric from the plurality of security metrics associated with the servers;
wherein the appearance comprises color of a shape; and
wherein the second security metric is selected from a group consisting of: a business value associated with a server location, certainty of a vulnerability, severity of a vulnerability, freshness of a vulnerability, market share of components, difficulty of vulnerability, mitigation priority, risk, and exploitability.

15. A computer program product including computer-executable code resident on a tangible media comprising:
code that directs the computer system to determine a plurality of security metrics associated with a plurality of servers within a network;
code that directs the computer system to display a tree map on the display representing at least a portion of the network, wherein the tree map comprises a plurality of shapes associated with servers from the plurality of servers, wherein a size of shapes in the plurality of shapes is determined in response to a first security metric from the plurality of security metric associated with the servers, and wherein an appearance of the shapes is determined in response to a second security metric from the plurality of security metrics associated with the servers;
code that directs the computer system to display configuration data associated with the server
wherein the configuration data is selected from a group consisting of: vulnerability data, port data, application data, patch data, vulnerability certainty, business value, business value, exploitability, downstream risk.

16. A computer system comprising:
a processor configured to determine a plurality of security metrics associated with a plurality of servers within a network;
a memory configured to store the plurality of security metrics; and
a display for displaying a tree map on the display representing at least a portion of the network, wherein the tree map comprises a plurality of shapes associated with servers from the plurality of servers, wherein a size of shapes in the plurality of shapes is determined in response to a first security metric from the plurality of security metric associated with the servers, and herein an appearance of the shapes is determined in response to a second security metric from the plurality of security metrics associated with the servers;
wherein the first security metric is selected from a group consisting of: a business value associated with a server location, certainty of a vulnerability, severity of a vulnerability, freshness of a vulnerability, market share of components, difficulty of vulnerability, mitigation priority, risk, and exploitability.

17. The computer system of claim 16 wherein the first security metric represents a change of a value with respect to time.

18. The computer system of claim 16 wherein the processor is configured to receive a selection of a shape from the plurality of shapes;
wherein the memory is configured to store configuration data associated with servers associated with shapes from the plurality of shapes; and
wherein the display is also configured to display the configuration data associated with a server associated with the shape that was selected.

19. The computer system of claim 16 wherein the display is configured to display a histogram representing vulnerability certainty of the plurality of servers within the network.

20. A computer system comprising:

a processor configured to determine a plurality of security metrics associated with a plurality of servers within a network;

a memory configured to store the plurality of security metrics; and a display for displaying a tree map on the display representing at least a portion of the network, wherein the tree map comprises a plurality of shapes associated with servers from the plurality of servers, wherein a size of shapes in the plurality of shapes is determined in response to a first security metric from the plurality of security metric associated with the servers, and herein an appearance of the shapes is determined in response to a second security metric from the plurality of security metrics associated with the servers;

wherein the appearance comprises color of a shape; and wherein the second security metric is selected from a group consisting of: a business value associated with a server location, certainty of a vulnerability, severity of a vulnerability, freshness of a vulnerability, market share of components, difficulty of vulnerability, mitigation priority, risk, and exploitability.

* * * * *